United States Patent [19]

Gausman et al.

[11] Patent Number: 4,840,191
[45] Date of Patent: Jun. 20, 1989

[54] INFLATABLE VALVE

[75] Inventors: Theodore J. Gausman, Mentor; Gary W. Scheffel, Streetsboro, both of Ohio

[73] Assignee: Nupro Company, Willoughby, Ohio

[21] Appl. No.: 178,065

[22] Filed: Apr. 5, 1988

[51] Int. Cl.⁴ .......................... F16K 7/10; F16K 43/00
[52] U.S. Cl. .................................. 137/15; 251/5; 251/61.1
[58] Field of Search ................. 251/5, 61.1; 137/15

[56] References Cited
U.S. PATENT DOCUMENTS

| | | | |
|---|---|---|---|
| 1,873,138 | 8/1932 | Mitchell | 251/61.1 |
| 2,622,619 | 12/1952 | Grove | 251/5 |
| 2,687,145 | 8/1954 | Carter | 251/61.1 |
| 2,781,051 | 2/1957 | Hawley | 251/61.1 |
| 2,822,050 | 2/1958 | Conrad . | |
| 3,038,488 | 6/1962 | Welch et al. | 251/61.1 |
| 3,303,974 | 2/1967 | Bleuler | 251/5 |
| 3,364,533 | 1/1968 | Sibraua et al. | 251/5 |
| 3,387,630 | 6/1968 | Routson | 251/5 |
| 3,397,860 | 8/1968 | Bushmeyer | 251/61.1 |
| 3,693,841 | 9/1972 | Hansen | 251/61.1 |
| 3,840,207 | 10/1974 | Carpenter, Jr. | 251/5 |
| 4,056,965 | 11/1977 | Heiser | 251/5 |
| 4,125,125 | 11/1978 | Ezekoye et al. | 251/61.1 |
| 4,186,764 | 2/1980 | Ottersen et al. | 137/414 |
| 4,300,748 | 11/1981 | Kreeley | 251/61.1 |
| 4,342,336 | 8/1982 | Satterthwaite et al. | 138/90 |
| 4,412,554 | 11/1983 | Chow | 251/61.1 |
| 4,536,105 | 8/1985 | Büngert | 251/61.1 |
| 4,621,655 | 11/1986 | Roche | 251/61.1 |
| 4,630,635 | 12/1986 | Bernstein et al. | 251/5 |

FOREIGN PATENT DOCUMENTS

| | | | |
|---|---|---|---|
| 2641196 | 9/1976 | Fed. Rep. of Germany | 251/61.1 |
| 1244750 | 10/1947 | France | 251/61.1 |
| 954333 | 1/1960 | France | 251/5 |
| 241857 | 8/1969 | U.S.S.R. | 251/61.1 |
| 436952 | 12/1974 | U.S.S.R. | 251/61.1 |
| 948243 | 1/1964 | United Kingdom | 251/5 |

Primary Examiner—George L. Walton
Attorney, Agent, or Firm—Fay, Sharpe, Beall, Fagan, Minnich & McKee

[57] ABSTRACT

An inflatable valve member includes a valve body received in a fluid line and defining a generally annular flow passage therewith. A flexible member disposed on the valve body is selectively inflated to open and close the flow passage. A filter is interposed between the valve body and flexible member. The filter prevents injection of the flexible member in a pre-cured state into an internal passage provided in the valve body. A bonding material is provided between the flexible member and the valve body to provide a secure mechanical engagement therebetween as the material is cured to a cross-linked polymer state. The bonding of the flexible member also eliminates crevices in the final assembled valve member. The fluid line also includes a linear portion at the outlet to facilitate drainage of the valve.

17 Claims, 2 Drawing Sheets

INFLATABLE VALVE

BACKGROUND OF THE INVENTION

This invention pertains to the art of inflatable valves and more particularly to an inflatable valve selectively opening and closing an annular flow passage and regulating fluid flow therethrough.

The invention is particularly applicable to an inflatable valve used in biotechnological environments where cleanliness is of the utmost importance and will be described with particular reference thereto. However, it will be appreciated that the invention has broader applications and may be advantageously employed in still other environments and applications.

The biotechnology industry has a number of stringent requirements particularly applicable to that field due to the nature of the products being handled. For example, chains of biological materials carried in a fluid medium are delicate and subject to severing as a result of turbulence or other rough handling. Ideally, the flow passages for handling these materials should promote laminar flow. The fluid line and any fluid handling devices such as valves, gauges, etc. preferably have smooth-walled surfaces to provide a generally constant flow area with little change in the coefficient of variation, $C_v$. This eliminates or prevents shearing of the biological chains and also the tendency for the biological material to secure to the fluid line surfaces. Thus, it is vital that crevices, dead spaces, or other areas where the biological material may become entrapped be minimized.

Materials of construction are also limited in the biotechnological area because of the need to meet FDA approval. Stainless steel construction is preferable for many of the valve parts because of its non-reactive or inert qualities. Sealing between metal valve parts is best effected through addition of resilient or elastomeric sealing members. Incorporation of the sealing members necessarily introduces an interface area or joint between the different materials of construction. Increased emphasis must be placed on the resulting joint between valve parts to eliminate exposure of interfacing areas of the different valve part materials in order to provide a "no crevice" arrangement.

The valve structure must also be drainable, i.e., prevent pooling of dluid when the valve is not in operation. Any remaining fluid in the fluid line, particularly in the biological environment, can adversely react with the next fluid batch. The proposed valve structure must also be compatible to flow passageways of reduced size and adapted for in-line application.

Various inflatable closure devices are known in the prior art. Nevertheless, they all suffer from the problems discussed above. That is, incorporation of a flexible, inflatable member has heretofore resulted in a final structure that still has crevices formed between the inflatable member and the remainder of the valve body. Thus, although the general concept of an inflatable member to close an annular flow passage is well known, prior structures are still not adaptable to the biotechnological field where the crevices can result in adverse consequences.

French Pat. No. 1,244,750 has a flexible member, premolded before assembly to a valve body, that is mechanically secured between first and second valve body members. A nose cone includes an elongated shaft that extends through the first valve body member and the annular, premolded flexible member. The shaft is exteriorly threaded at an outer end for operative engagement with the second valve body member. This structural arrangement retains the valve body members in secure mechanical engagement and traps the flexible member therebetween. Nevertheless, crevices between the premolded flexible member and the adjacent valve body members result and are completely unsuitable for the biotechnological arrangement under consideration.

Likewise, French Pat. No. 954,333 secures a flexible band or cuff around the external surface of a valve body. This obviously does not provide a smoothwalled configuration that would promote laminar flow or inhibit entrapment of biological material. Thus, this arrangement is also deemed to be unsuitable for use in the biotechnological environment.

The valve structure should also be easily assembled to facilitate manufacture and incorporation of the valve into a pre-existing fluid line. Prior art arrangements have been quite complicated including complex valve body structures.

The present invention contemplates a new and improved valve apparatus and method of constructing same that overcomes all of the above-referred to problems and others in an economical, easily assembled structure.

SUMMARY OF THE INVENTION

According to the present invention, there is provided an inflatable valve in which a flexible member is integrally bonded to a valve body to eliminate crevices.

According to a more limited aspect of the invention, the a valve body is received in a fluid line to define a generally annular flow passage. A filter is interposed between the valve body and flexible member to limit entry of the flexible member in an uncured state to an interior passage defined in the valve body.

According to another aspect of the invention, a bonding agent is disposed between the flexible member and valve body to facilitate interconnection therebetween during a curing operation.

According to a still further aspect of the invention, the filter has a mean pore diameter between 2 and 90 microns.

According to yet another aspect of the invention, an air operated actuator includes a chamber communicating with the interior passage of the valve body for supplying a predetermined volume of fluid to inflate the flexible member.

A principal advantage of the invention resides in the intergal bonding of the flexible member to the valve body to eliminate any crevices.

Yet another advantage of the invention resides in the use of a filter between the flexible member and valve body to prevent blockage of the valve body interior passage and provide support to the flexible member so the actuator is unaffected by back pressure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

Figure 1:
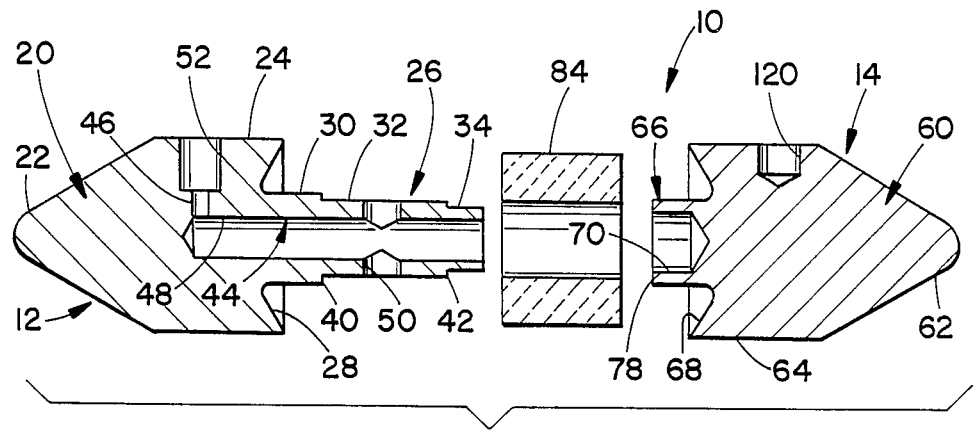
FIG. 1 is an exploded, cross-sectional view of the valve body components and filter prior to assembly.

DETAILED DESCRIPTION OF THE PREFERRED EMBODIMENT AND METHOD OF MANUFACTURING SAME

Referring now to the drawings wherein the showings are for purposes of illustrating the preferred embodiment of the invention and method of manufacturing same and not for purposes of limitation, the FIGURES show a fluid line A having an inflatable valve B disposed therein to regulate fluid flow through an annular flow passage C. In a preferred embodiment, the inflatable valve is actuated by an externally mounted air operated actuator D.

The valve B includes a valve body 10 having first and second body members 12, 14. The first body member includes a generally conical nose portion 20 that gradually increases in diameter from a rounded apex 22 to an enlarged, generally constant diameter region 24. A reduced diameter stem 26 extends axially outward from the region 24 and is interconnected thereto by an axially and radially inward extending, generally frusto-conical shoulder 28. The stem includes three distinct, portions 30, 32, 34 each decreasing in diameter as the stem extends axially from shoulder 28. Radially extending shoulders 40, 42 are defined between the first and second stem portions 30, 32 and the second and third stem portions 32, 34, respectively. An internal passage 44 is formed in the first body member and includes a radially extending inlet portion 46 through region 24, axially extending central portion 48, and radially extending outlet portion 50 through stem portion 26. The inlet portion 46 also includes a counterbore 52 for reasons which will become more apparent hereinbelow.

Figure 2:
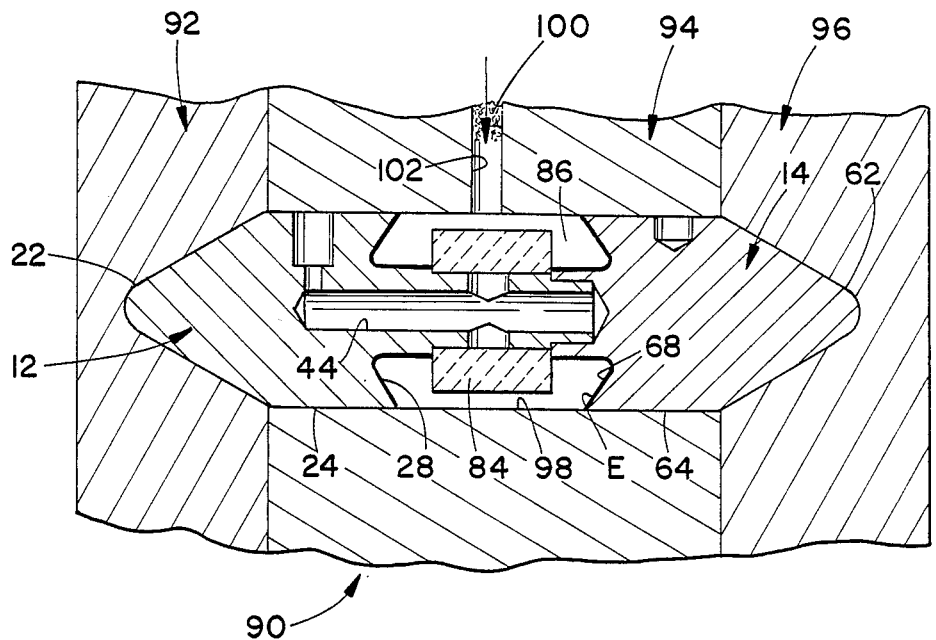
FIG. 2 illustrates the injection of an elastomeric material in an uncured state into a mold for receipt over the filter and assembled valve body components.
Figure 3:
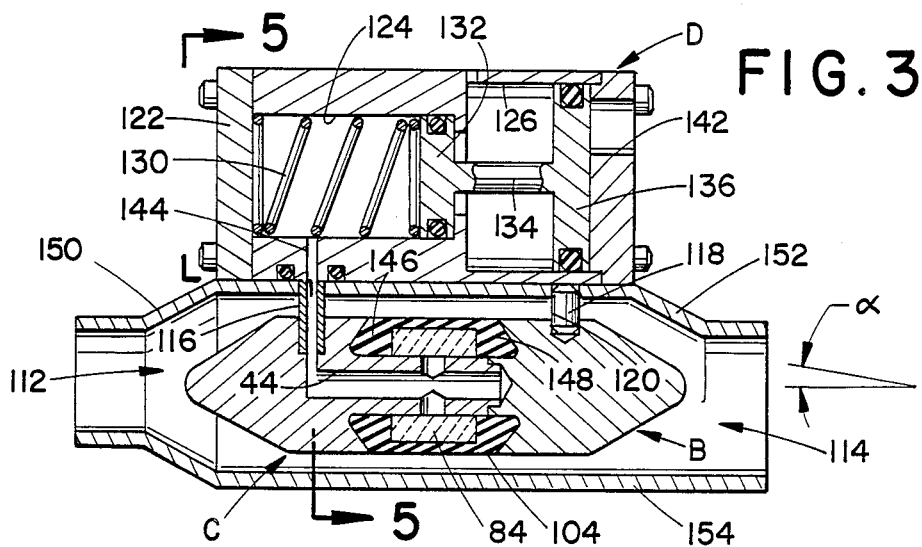
FIG. 3 is a cross-sectional view of an air operated valve in accordance with the subject invention and the flexible member in a deflated, open position.
Figure 4:
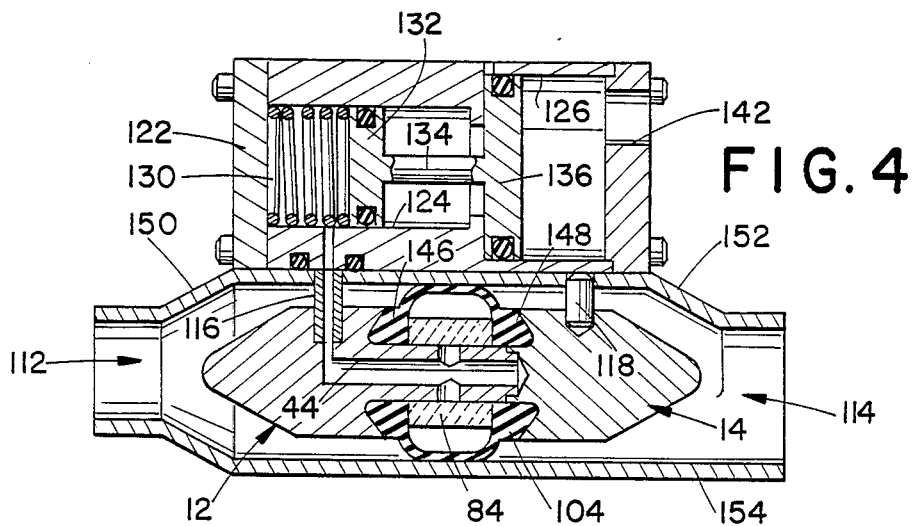
FIG. 4 illustrates the valve arrangement of FIGURE 3 with the inflatable member in an inflated, closed position.

A second body member 14 also includes a generally conical nose portion 60 that increases in diameter from a rounded apex 62 to a generally constant diameter region 64. The nose portion 60 and region 64 promote laminar flow around the second body member like their counterpart elements in the first body member 12. An axially extending stub 66 extends outwardly from a generally frusto-conical shoulder 68. The shoulder extends generally axially and radially inward for interconnecting the stub with the region 64. The stub includes an internal bore 70 dimensioned to closely receive the third stem portion 34 of the first body member therein. The outer diameter dimension of the stub closely corresponds to the peripheral dimension of the first stem portion 30 of the first body member. In this manner, and as illustrated in FIGS. 2–4, outer end 78 of the stub defines a radially extending shoulder with the second stem portion 32 of the first body member. Again, symmetry of contruction is apparent in the assembled valve body, particularly shoulders 40, 78.

A generally annular filter 84 is received over the second stem portion 32 and is axially retained between shoulders 40, 78. This positioning of the filter covers the outlet portions 50 of the internal passage 44 for reasons to be discussed below. An outer periphery of the filter is dimensioned substantially less than that of the constant diameter regions 24, 64 of the first and second body members thus defining a generally annular cavity 86.

With particular reference to FIG. 2, the cavity 86 is more apparent when the assembled valve body members and filter are received in mold 90. The mold includes first, second and third portions 92, 94, 96. The first portion 92 closely receives the conical nose portion 20 of the first body member. Likewise, the third portion 96 closely receives the nose portion 60 of the second body member. The second portion 94 extends between the enlarged diameter regions 24, 64 of the first and second body members. The interior surface 98 of the second mold portion defines a smooth, constant diameter continuation between the regions 24, 64 to enclose the cavity 86 defined axially between the frusto-conical shoulder 26, 68 and radially outward of first stem portion 30, filter 84, and stub 66.

Prior to admission of an uncured, elastomeric material 100 through passage 102 in the mold, the frustoconical shoulders 28, 68, as well as the first stem portion 30 and outer periphery of the stub 66, are coated with a bonding material or adhesive E that facilitates mechanical interconnection between the material 110 and the metallic valve body members. According to a preferred arrangement, a bonding material denoted by product number PSB20 available from Ashtabula Rubber Co. of Ashtabula, Ohio has shown success. Of course one of ordinary skill in the art will realize that other bonding materials may be used for bonding different elastomeric materials to a valve body of different composition without departing from the scope and intent of the subject invention. The bonding material assures that the resultant valve is an integral structure even though different materials of construction are used for the different components.

The filter 84 has a mean pore diameter between 7 and 90 microns, preferably having a mean pore diameter approximating 15 microns. The filter prevents the elastomeric material 100 from entering the internal passage 44 of the valve body and clogging or interfering with operation of the valve. The uncured, elastomeric material is placed under high pressure so that it has some fluid-like properties. The injected, uncured material completely fills the cavity without passing through the pores of the filter and, after curing, provides a smooth, crevice-free interconnection between the constant diameter regions 24, 64. As described above, it is critical that crevices be eliminated between the different materials of the valve. Once the elastomeric material 100 has filled the cavity, the assembly is cured, through heat, chemical, or similar curing steps resulting in a cured, cross-linked polymer 104 having a solid state that remains flexible.

By way of example, elastomers having the properties of EPR, ethylene-propylene rubber, have been used with success. Under this general group, EPDM (ethylene propylene diene monomer) and EPT (ethylene propylene terpolymer) materials, or materials of this type, are considered preferable. Still other non-oil elastomers such as SBR (styrene butadene rubber) can be used or oil resistant elastomers sold under the trademarks VITON, NEOPRENE, or the like can be used under different operating parameters. The specific environment or use will dictate the elastomeric material most suitable as will be understood by those skilled in the art.

Figure 5:
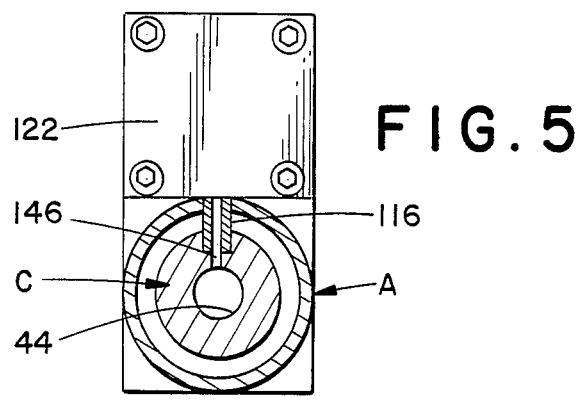
FIG. 5 is a cross-sectional view generally along the lines 5—5 of FIG. 4 particularly illustrating the generally annular flow passage around the valve body.

As is evident in FIGS. 3, and 4, with the first and second body members secured together with an integrally molded flexible member, the assembled valve is disposed in the fluid line A between an inlet 112 and outlet 114. The internal passage 44 of the valve body is interconnected by means of sleeve 116 with an air supply external to the fluid line. Additionally, the sleeve provides support for the valve body as does the support member 118 extending radially between the second body member 14 and the fluid line. Sleeve 116 is dimensioned for close fitting engagement with counterbore 52. Likewise, support member 118 is received in support recess 120 of the second valve body. Preferably, the sleeve and support member are welded to the valve body and fluid line to provide a secure and sealed interconnection that eliminates crevices. Moreover, the sleeve and support member have substantially the same cross-sectional dimension to maintain a generally constant flow passage configuration C (FIG. 5) around the valve body.

In a preferred embodiment, the air supply is defined by an air operated actuator D including a housing 122 having coaxial, different diameter bores 124, 126. The reduced diameter first bore receives a biasing means such as spring 130 and piston member 132 urged toward a first, valve open position by the spring. The piston member is interconnected by means of stem 134 with an actuating piston 136 sealingly received in the enlarged second bore 124. Air supplied to the second bore through inlet 142 advances the actuating piston leftwardly to overcome the bias of spring 130. The piston member 132 expels fluid of a predetermined volume from the chamber 122, through housing outlet 144, through sleeve 116, and into internal passage 44 of the valve body. The fluid then passes through the filter 84 and inflates the flexible elastomeric member 104 into a valve closed position illustrated in FIG. 4.

The reduced wall thickness of the flexible member along the annular area encompassing the filter inflates into sealing engagement with the internal wall of the flow passage. This shuts off fluid flow through the annular flow passage defined between the valve body and fluid line. The enlarged portions of the flexible member axially interposed between the filter and respective frusto-conical shoulders have sufficient bulk and a predetermined contour to mechanically stabilize the inflatable element against blowout pressures.

More specifically, enlarged end portions 146, 148 of the flexible member are tapered axially inward toward the filter as they extend radially outward from bonded interconnection with stem portion 30 and stub 66 toward regions 24, 64. The frusto-conical shoulders 28, 68 provide an overhanging mechanical engagement that resists pullout forces resulting from inflation of the flexible member. In conjunction with the bonding material and the enlarged predetermined contour portions, the flexible member arrangement is adapted for an enlarged cycle lift.

Removal of air pressure from inlet 142 permits the biasing force of spring 130 to return the piston member and actuating piston to their normally closed position. The predetermined volume of fluid is urged by the memory of flexible member 104 into the first bore of the housing 122 and relaxation of the flexible member again permits fluid flow through the annular flow passage.

Yet another aspect of the invention includes the drainability of the valve which is crucial in biotechnological applications. Specifically, the inlet of the flow passage tapers outwardly at 150 to provide a smooth flow path as the fluid passes around the valve body. The flow passage C around the valve body is particularly illustrated in FIG. 5 and remains generally constant as fluid flows along the axial extent thereof. At the outlet end, the fluid line tapers radially inward along an upper portion 152 of its circumference to correspond to the taper of the second body member 14. The lower portion 154 of the fluid line, though, does not taper inwardly but continues to extend in a generally linear path. Thus at the outlet, the fluid line has only a partial frusto-conical configuration 152 interrupted along its circumference by the linear portion 154. This permits any fluid that remains in the flow passage to exit the outlet and facilitates drainability of the valve.

In a modified arrangement, the valve body 10 has a slight radially decreasing taper over its axial length to facilitate removal of the valve from the mold 90 and enhance drainability of the valve. As described in the preferred embodiment, the regions 24, 64 of the first and second body membres, respectively, had a generally constant, equal dimension. As modified, the upstream body member 12 has a diameter slightly greater than the downstream body member. Preferably, the valve body reduces in diameter along a taper ranging from 0° to 10° along its axial dimension as represented by angle alpha in FIG. 3. That is, the downstream body member and flexible member decrease in diameter as they extend from region 24 of the first body member.

The invention has been described with reference to the preferred embodiment and method of manufacturing same. Obviously modifications and alterations will occur to others upon a reading and understanding of this specification. Equivalent materials of construction may be substituted for those described in the preferred embodiments. For example, there are FDA approved bonding agents for FDA approved elastomers other than EPDM. The bonding agents, as well as the elastomers, differ in composition from non-FDA approved versions that can be utilized essentially as described above for different environments and applications. Likewise, other suitable arrangements for supplying pressurized fluid to the passage 44 may be used instead of the actuator D without departing from the scope and intent of the subject invention. Alternately, the valve body may be disposed on the sidewall of the fluid line so that the flexible member expands radially inward to selectively close the fluid passage. It is intended to include all such modifications and alterations insofar as they come within the scope of the appended claims or the equivalents thereof.

Having thus described the invention, it is now claimed:

1. A valve comprising:
   a fluid line;
   a valve body disposed in said fluid line including first and second body members connected together and having an internal passage therein;
   a annular flexible member received on said valve body, said flexible member sealingly received around a portion of said internal passage and adapted to inflate and deflate as a result of selective communication with an associated fluid source; and, an axially continuous annular filter interposed between said valve body and said flexible member, said filter receiving at least one of said body members therein and interconnecting said other body member thereto, said filter having openings adapted to permit fluid flow therethrough to selectively inflate and deflate said flexible member.

2. The valve as defined in claim 1 wherein said flexible member is an elastomer material cured to said valve body to form a cross-linked elastomeric polymer material.

3. The valve as defined in claim 1 wherein said flexible member is an EPDM-type material.

4. The valve as defined in claim 1 further comprising a bonding agent disposed between said flexible member and valve body for mechanically bonding therebetween.

5. The valve as defined in claim 1 wherein said filter has a mean pore diameter between 7 and 90 microns.

6. The valve as defined in claim 1 wherein said filter has a mean pore diameter approximating 15 microns.

7. The valve as defined in claim 1 further comprising means for inflating and deflating said flexible member for opening and closing the associated fluid line, respectively.

8. The valve as defined in claim 7 wherein said inflating and deflating means includes a chamber having a predetermined volume and a piston adapted for forcing an associated fluid from said chamber through said filter and inflating said flexible member.

9. The valve as defined in claim 1 wherein said flexible member includes enlarged end portions tapering axially inward as the end portions extend radially outward.

10. The valve as defined in claim 1 wherein said valve body tapers over its axial dimension.

11. The valve as defined in claim 1 wherein said valve body has a taper ranging from 0° to 10°.

12. A method of assembling a valve member comprising the steps of:
connecting a plurality of valve body members for defining a fluid supply line therein extending between an inlet and outlet;
placing an annular filter over the outlet, filter receiving at least one of said body members therein and interconnecting said other body member thereto;
bonding an elastomeric material to the valve body members and encompassing the outlet and filter; and,
curing said elastomeric material on the valve body members.

13. The method as defined in claim 12 wherein said bonding step includes placing a bonding material on said valve body members at regions adapted to receive the elastomeric material.

14. The method as defined in claim 13 wherein said bonding step further comprises the step of injecting the elastomeric material under high pressure.

15. A valve assembly comprising:
a fluid line;
a valve body disposed in said fluid line for regulating fluid flow therethrough, said valve body including first and second body members interconnected together and having an internal passage therein;
an annular flexible member received on said body members, said flexible member selectively received around a portion of said internal passage and adapted to inflate to a closed position with said fluid line and deflate to an open position through selective communication with an associated fluid source;
a bonding agent disposed between said flexible member and body member for mechanically bonding therebetween; and,
an annular filter radially interposed between said internal passage and said flexible member, and axially interposed between said body members, said filter receiving at least one of said body members therein and interconnecting said other body member thereto, said filter having openings adapted to permit fluid flow therethrough to selectively inflate and deflate said flexible member.

16. The valve assembly as defined in claim 15 wherein at least a portion of said fluid line outlet is substantially linear to facilitate drainage of said flow passage.

17. The valve assembly as defined in claim 15 wherein said filter has a mean port diameter between 7 and 90 microns.

* * * * *